US010447987B2

(12) United States Patent
Lee

(10) Patent No.: US 10,447,987 B2
(45) Date of Patent: Oct. 15, 2019

(54) LIGHTING DEVICE AND VEHICLE LAMP INCLUDING SAME

(71) Applicant: LG INNOTEK CO., LTD., Seoul (KR)

(72) Inventor: Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/576,946

(22) PCT Filed: May 27, 2016

(86) PCT No.: PCT/KR2016/005630
§ 371 (c)(1),
(2) Date: Nov. 27, 2017

(87) PCT Pub. No.: WO2016/190702
PCT Pub. Date: Dec. 1, 2016

(65) Prior Publication Data
US 2018/0160095 A1    Jun. 7, 2018

(30) Foreign Application Priority Data

May 28, 2015  (KR) .................. 10-2015-0074588

(51) Int. Cl.
*H04N 13/128*     (2018.01)
*F21S 43/00*      (2018.01)
(Continued)

(52) U.S. Cl.
CPC ......... *H04N 13/128* (2018.05); *B60Q 1/0058* (2013.01); *F21S 43/00* (2018.01);
(Continued)

(58) Field of Classification Search
CPC ........ F21S 43/00; F21S 10/005; F21S 43/116; F21S 43/239; F21S 43/245; F21S 43/26;
(Continued)

(56) References Cited

U.S. PATENT DOCUMENTS 8,998,479 B2 *  4/2015  Brick ................... G02B 6/0041
                                                    362/608
9,103,959 B2 *  8/2015  Jeong .................... G02B 6/003
(Continued)

FOREIGN PATENT DOCUMENTS

CN     202598306      12/2012
CN     203909333      10/2014
(Continued)

OTHER PUBLICATIONS

International Search Report (with English Translation) and Written Opinion dated Aug. 24, 2016 issued in Application No. PCT/KR2016/005630.
(Continued)

*Primary Examiner* — Peggy A Neils
(74) *Attorney, Agent, or Firm* — KED & Associates LLP

(57) ABSTRACT

Provided are a lighting apparatus that is capable of implementing various stereoscopic effects and a lamp for a vehicle including the lighting apparatus. A volumic type, a depth effect, and a stereoscopic effect of optical patterns emitted after an interaction of excited light of emission layers disposed in adjacent light source modules can be implemented so that various designs of three-dimensional (3D) light can be implemented.

14 Claims, 4 Drawing Sheets

(51) Int. Cl.
*F21V 8/00* (2006.01)
*B60Q 1/00* (2006.01)
*F21S 43/20* (2018.01)
*F21S 43/239* (2018.01)
*F21S 43/245* (2018.01)
*F21S 43/16* (2018.01)
*H04N 13/395* (2018.01)

(52) U.S. Cl.
CPC ............. *F21S 43/16* (2018.01); *F21S 43/239* (2018.01); *F21S 43/245* (2018.01); *F21S 43/26* (2018.01); *G02B 6/0033* (2013.01); *H04N 13/395* (2018.05)

(58) Field of Classification Search
CPC ...... F21S 43/247; F21S 43/16; G02B 6/0035; G02B 6/0075; G02B 6/0076; B60Q 1/0058
See application file for complete search history.

(56) References Cited

U.S. PATENT DOCUMENTS

| | | | |
|---|---|---|---|
| 9,366,412 B2* | 6/2016 | Kim | ............ F21V 9/08 |
| 9,885,820 B2* | 2/2018 | Kim | ............ G02B 6/0035 |
| 2003/0235050 A1 | 12/2003 | West et al. | |
| 2011/0007524 A1* | 1/2011 | Nagatani | ............ G02B 6/0061 362/616 |
| 2011/0199555 A1 | 8/2011 | Coe-Sullivan et al. | |
| 2011/0221998 A1* | 9/2011 | Adachi | ............ G02B 6/0036 349/62 |
| 2013/0010487 A1 | 1/2013 | Buisson | |
| 2013/0148371 A1 | 6/2013 | Kim | |
| 2015/0268399 A1* | 9/2015 | Futterer | ............ G02B 6/005 315/151 |
| 2015/0316227 A1* | 11/2015 | Sahlin | ............ B60Q 1/0058 362/511 |

FOREIGN PATENT DOCUMENTS

| | | | | |
|---|---|---|---|---|
| DE | 102010006348 | * | 8/2011 | ............ F21S 8/10 |
| KR | 10-2014-0009869 | | 1/2014 | |
| KR | 10-2015-0009675 | | 1/2015 | |
| WO | WO 2014/105424 | | 7/2014 | |

OTHER PUBLICATIONS

Chinese Office Action dated Jul. 30, 2019 issued in Application No. 201680030354.8.

* cited by examiner

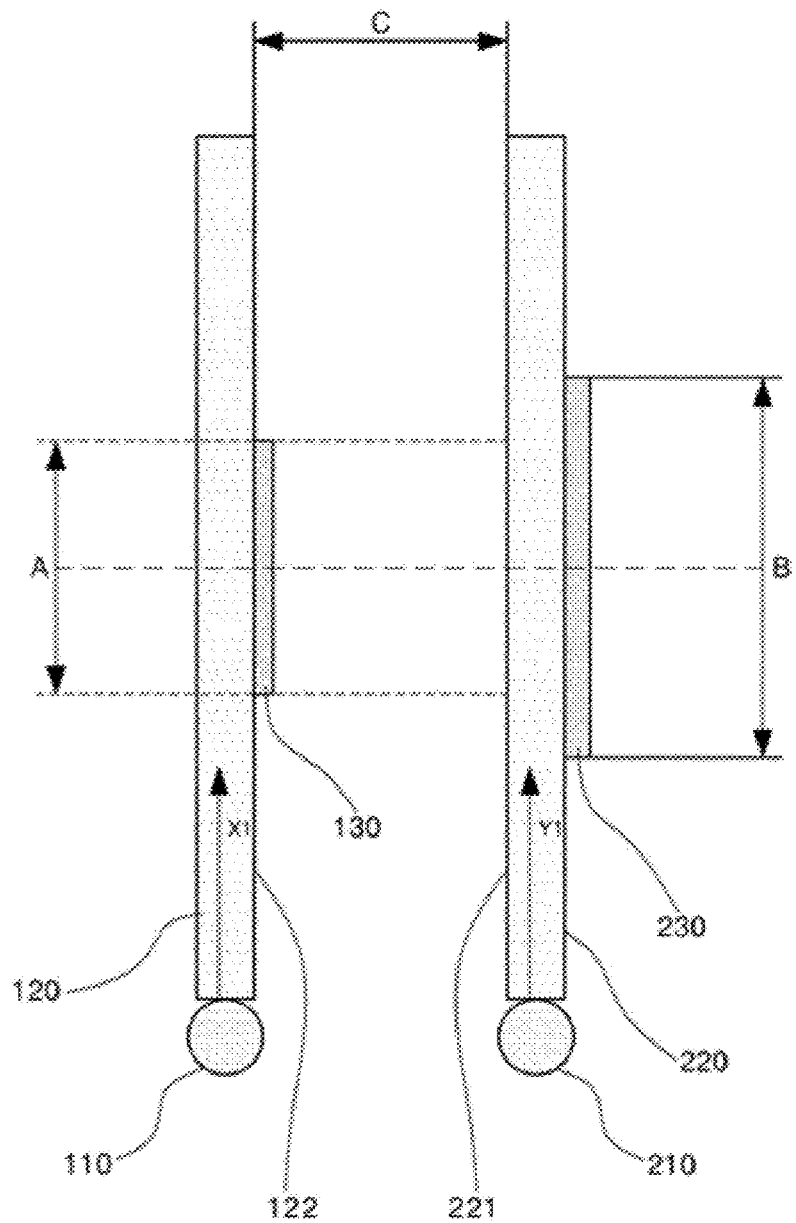

LIGHTING DEVICE AND VEHICLE LAMP INCLUDING SAME

CROSS-REFERENCE TO RELATED PATENT APPLICATIONS

This application is a U.S. National Stage Application under 35 U.S.C. § 371 of PCT Application No. PCT/KR2016/005630, filed May 27, 2016, which claims priority to Korean Patent Application No. 10-2015-0074588 filed May 28, 2015, whose entire disclosures are hereby incorporated by reference.

TECHNICAL FIELD

The present invention relates to a lighting apparatus that is capable of implementing various stereoscopic effects and a lamp for a vehicle including the same.

BACKGROUND ART

Lighting units may be applied to backlight units used in flat panel displays, to indoor/outdoor billboards, to indoor lamps used in an indoor environment, to lamps installed in the exterior of a vehicle such as headlamps, fog lamps, retreat lights, sidelights, license plate lights, taillights, stop lamps, turn signal lamps, or hazard flasher lamps, or to indoor lights installed inside the automobile in various ways. Most of these lighting units increase the luminance of a surface light source by using a member such as a light guide panel for enhancing transmission of provided light.

In vehicle lighting, light-emitting diodes (LEDs) for implementing high efficiency lighting are lately being used as light sources. The frequency with which LED packages are being used as a light source in flat panel lighting in vehicles is increasing greatly. However, when an LED package is used as a light source, a large amount of light is inevitably required or the number of light emitting devices of an emission surface inevitably increases in order to achieve surface light emission. When a large number of LED packages are used, problems relating to cost, circuit implementation between devices in a curved or narrow space of a vehicle, and heat dissipation occur, leading to critical disadvantages of high-cost and low-efficiency. In particular, the need for various designs for vehicle lighting in limited space is increasing, and these days the demand for implementing three-dimensional (3D) light, or light having a particular shape, is increasing. There is an AMECA regulation that requires the inside of a lamp should be transparent in a vehicle to be exported. Thus, this regulation is necessarily enforced upon export. Thus, designs for stereoscopic lights that satisfy the regulation are required.

DISCLOSURE

Technical Problem

The present invention is directed to providing a lighting apparatus in which a stereoscopic effect is implemented using a volumic type and a depth effect of optical patterns emitted after an interaction of excited light of emission layers disposed in adjacent light source modules so that various designs of three-dimensional (3D) light can be implemented.

Technical Solution

One aspect of the present invention provides a lighting apparatus having a structure in which at least two light source modules are disposed adjacent to each other. In particular, the at least two light source modules include: an nth light source module including an nth light guide member configured to guide a first light emitted from an nth light source, and including an nth emission layer, which is formed on the nth light guide member and in which light of a wavelength of light from the nth light source is used as excited light; and an (n+1)th light source module including an (n+1)th light guide member configured to guide a portion of light emitted from the nth light source and light emitted from the (n+1)th light source, and including an (n+1)th emission layer, which is formed on the (n+1)th light guide member and in which light that passes through the nth light source module and light from the (n+1)th light source are used as excited light.

Advantageous Effects

According to an embodiment of the present invention, a volumic type, a depth effect, and a stereoscopic effect of excited light of an emission layer disposed in an adjacent light source module can be implemented so that various designs of three-dimensional (3D) lights can be implemented.

In particular, when a lighting apparatus according to an embodiment of the present invention is applied to a lamp for a vehicle, various images can be produced without restrictions on structure, and an emission color and shape of the lamp can be freely chosen.

Furthermore, a lighting apparatus that satisfies the North American Automotive Manufacturers Equipment Compliance Agency, Inc. (AMECA) standard relating to vehicle lighting can be implemented using a transparent emission layer so that the universality of the lighting apparatus can be ensured.

DESCRIPTION OF DRAWINGS

FIG. 2 is a cross-sectional conceptual view for explaining a configuration of the lighting apparatus according to an embodiment of the present invention.

MODES OF THE INVENTION

Figure 1:
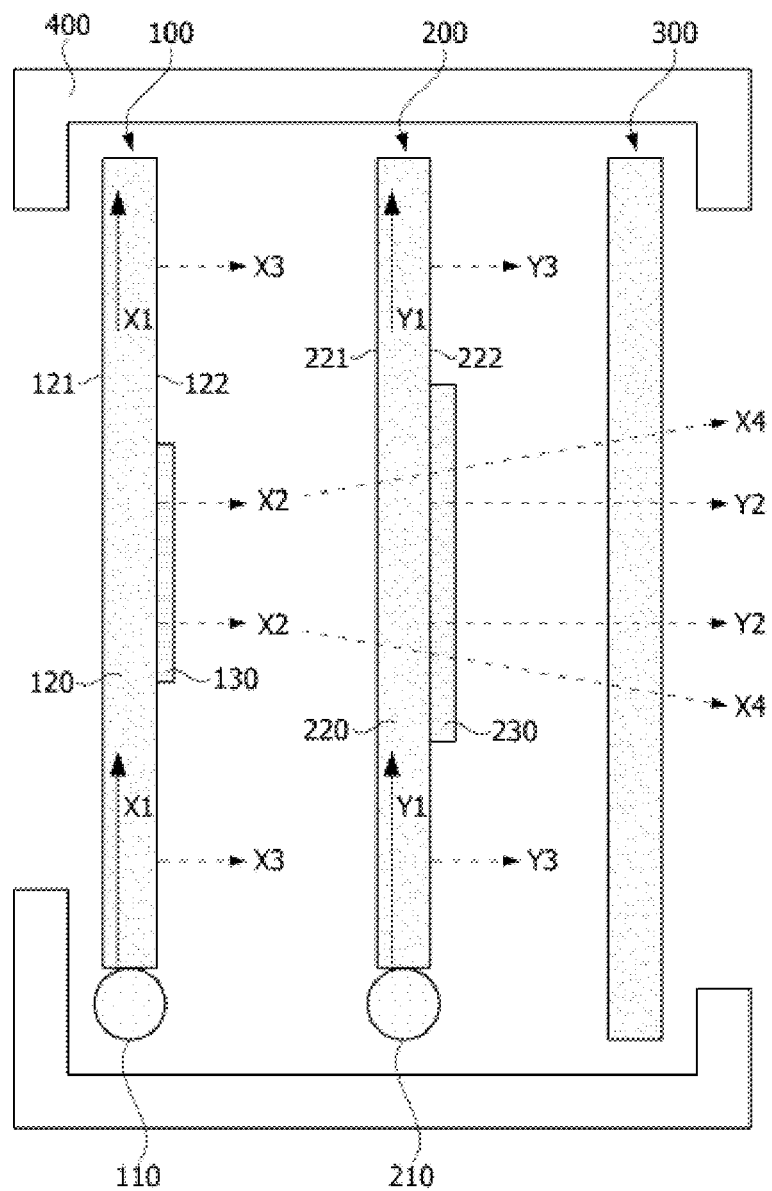
FIG. 1 is a cross-sectional conceptual view of a mode of operation of a lighting apparatus according to an embodiment of the present invention.

Hereinafter, a configuration and an operation of the present invention will be described in detail with reference to the attached drawings. In description with reference to the attached drawings, like reference numerals are used for like elements regardless of a drawing number, and redundant descriptions thereof will be omitted. It will be understood that, although the terms first, second, etc. may be used herein to describe various elements, these elements should not be limited by these terms. These terms are only used to distinguish one element from another.

In the description of embodiments, when layers (films), regions, patterns or structures are formed "on" or "under" a substrate, layers (films), regions, pads or patterns, "on" and "under" include all cases where layers (films), regions, patterns or structures are formed "directly" or "indirectly" on or under the substrate, the layers (films), the regions, the pads or the patterns. In the drawings, the thickness or size of each layer is exaggerated or omitted or schematically shown for convenience and clarity of explanation. Also, the size of each element does not reflect an actual size completely. Hereinafter, embodiments will be described with reference to the attached drawings.

FIG. 1 is a cross-sectional conceptual view of a mode of operation of a lighting apparatus according to an embodiment of the present invention, and FIG. 2 is a cross-sectional conceptual view for explaining a configuration of the lighting apparatus according to an embodiment of the present invention.

Referring to FIGS. 1 and 2, a lighting apparatus according to an embodiment of the present invention includes two or more light source modules 100 and 200, which are disposed adjacent to each other in a case 400. An nth light source module 100 includes an nth light guide member 120 that guides light emitted from an nth light source 110, and an nth emission layer 130, which is formed on the nth light guide member 120 and in which light of a wavelength of light from the nth light source 110 is used as excited light.

An (n+1)th light source module 200 includes an (n+1)th light guide member 220 that is disposed adjacent to the nth light source module 100 and guides a portion of light emitted from the nth light source and light emitted from an (n+1)th light source 210, and includes an (n+1)th emission layer 230, which is formed on the (n+1)th light guide member 220 and in which light passing through the nth light source module 100 and light from the (n+1)th light source 210 are used as excited light. Here, 'n' is a natural number.

In FIGS. 1 and 2, the lighting apparatus has a structure including two light source modules. However, an embodiment of the present invention is not limited thereto. Of course, at least two or more light source modules are disposed adjacent to each other. Hereinafter, an embodiment will include two light source modules disposed (n=1) as in the illustrated structure, and the structure of the lighting apparatus according to an embodiment of the present invention will be described.

In detail, when n=1, in the structure of the lighting device illustrated in FIG. 1, the first light source module 100 and the second light source module 200 may face each other and may be adjacent to each other. Here, the concept of being 'adjacent' to each other refers to a case in which two light source modules are spaced a predetermined distance apart from each other or predetermined portions of the two light source modules are in contact with each other and very close to each other.

The first light source module 100 may include a first light source 100 that emits light, and a first light guide member 120 that guides light emitted from the first light source 100, as illustrated in FIG. 1. The first light source 110 may be one among various types of light sources, such as a light-emitting diode (LED), an organic light-emitting diode (OLED), an ultraviolet (UV) lamp, and a laser diode (LD). The first light source 110 may output light in an UV wavelength band.

The first light guide member 120 performs a function of guiding light emitted from the first light source 110 onto an emission surface. In an embodiment of the present invention, preferably, the first light guide member 120 is formed of a synthetic resin material having birefringence characteristics. As an example, the first light guide member 120 may be formed of a synthetic resin such as polycarbonate (PC), polymethyl methacrylate (PMMA), or the like. If necessary, the light guide member further includes a light diffusion material or has a structure in which light is reflected onto an inner surface of one side of the light guide member so that transmission efficiency and scattering efficiency of light can be enhanced.

Light X1 emitted from the first light source 110 is incident onto a side of the first light guide member 120 and extends in a longitudinal direction of the first light guide member 120. In this case, the light may be reflected off of one surface 121 and the other surface 122 of the first light guide member 120.

The first emission layer 130 that is formed on the first light guide member 120 may be directly printed on a top surface of the first light guide member 120 or coated thereto, or may be disposed in close contact with an independent, separate sheet structure. Furthermore, the first emission layer 130 may be implemented with a structure in which an additional spacer member is inserted between the first light guide members 120 to form a predetermined separation space. The first emission layer 130 may be disposed on the other surface 122 of the first light guide member 120 that faces the second light guide member 220.

The first emission layer 130, which is a resin layer in which light emitted from the first light guide member 120 is used as excited layer, is implemented using a transparent or semitransparent resin in which light in a particular wavelength band is used as excited light. As an example, the first emission layer 130 is implemented by printing a transparent ink material onto the surface of the first light guide member 120, and is where light emitted from the first light guide member 120 is used as excited light. For example, light having a UV wavelength of 480 nm may be used as light to be excited and changed into red light, or light having a wavelength of 390 nm may be used as light to be excited and changed into blue light.

A refractive index of the first emission layer 130 may be higher than that of the first light guide member 120. According to this configuration, light may be prevented from being reflected off of a boundary surface between the first light guide member 120 and the first emission layer 130.

The second light source module 200 is disposed adjacent to the first light source module 100 and guides the light X1 emitted from the first light source 110 using the first light guide member 120 so that lights X2 and X3 are emitted in a light emission direction and surface light emission can be performed. In particular, a portion of the light X2 passes through the first emission layer 130 and is excited. A portion of the excited light X2 is transmitted to the adjacent second light source module 200. Also, a light Y1 emitted from the second light source 210 of the second light source module 200 is guided in the same way as light was guided in the first light source module, and a portion of the light Y1 can be transmitted to the second emission layer 230 and can be excited in the second emission layer 230. In this case, light for exciting the second emission layer 230 may include portion of light Y2 of the second light source 210 described above and portions of lights X2 and X4 of the first light source. In an example, the portion of light Y2 of the second light source 210 and the portion of light X4 of the first light source are light in the UV wavelength band or light having a single wavelength and thus may excite the second emission layer 230. That is, light that passes through the emission layer in one light source module is used as excited light in an adjacent emission layer.

Figure 3A:
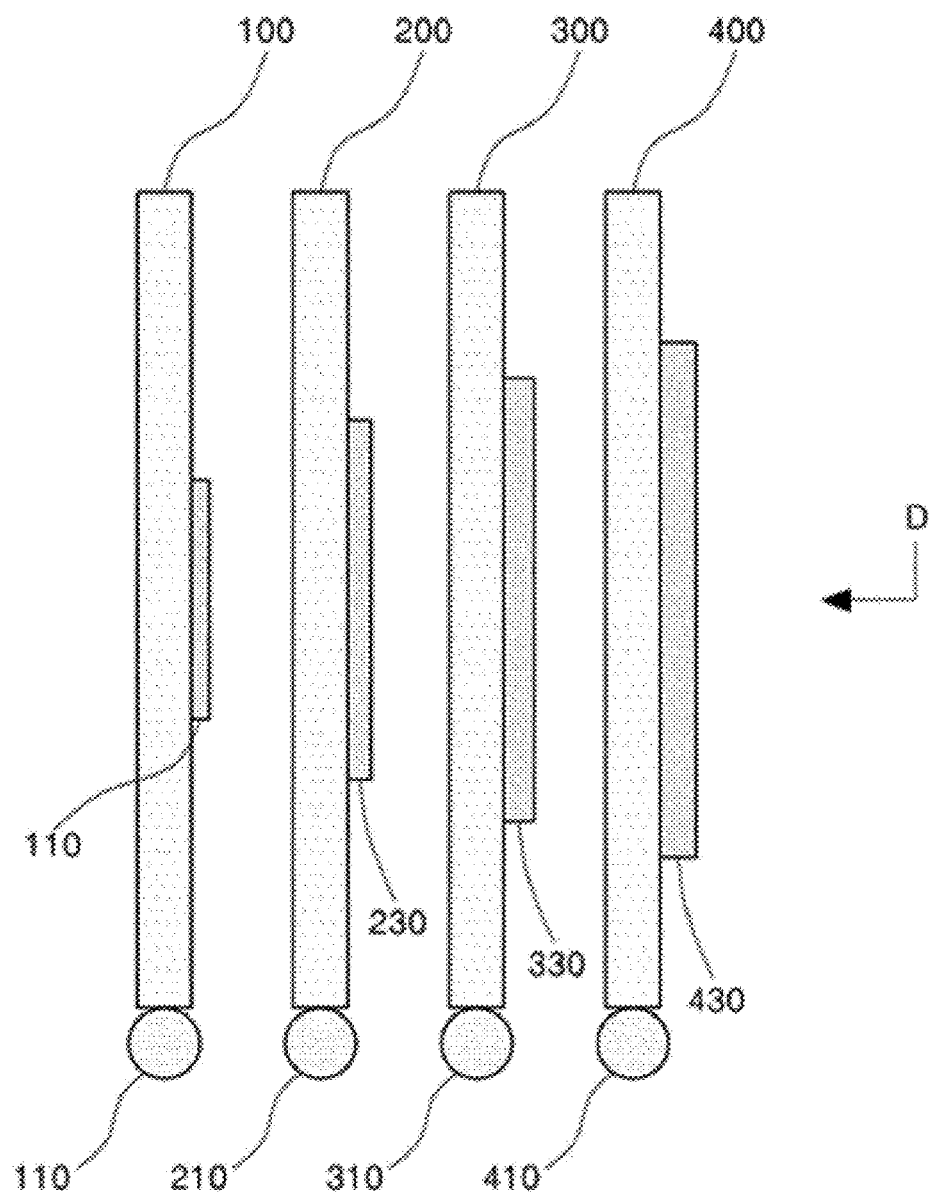
FIGS. 3A through 3C are illustrate stereoscopic light implemented according to an embodiment of the present invention.
Figure 3B:
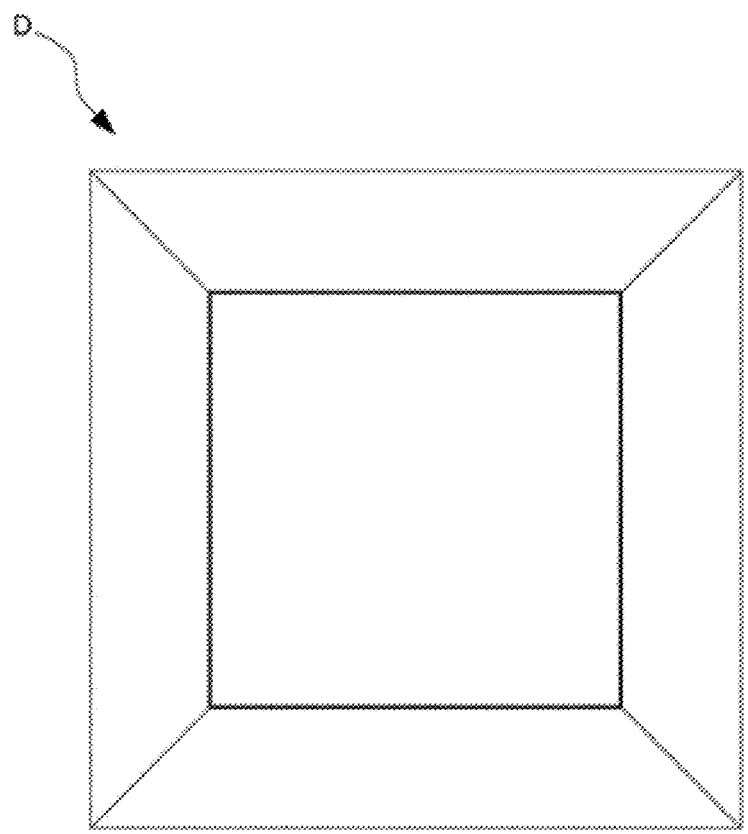
Figure 3C:
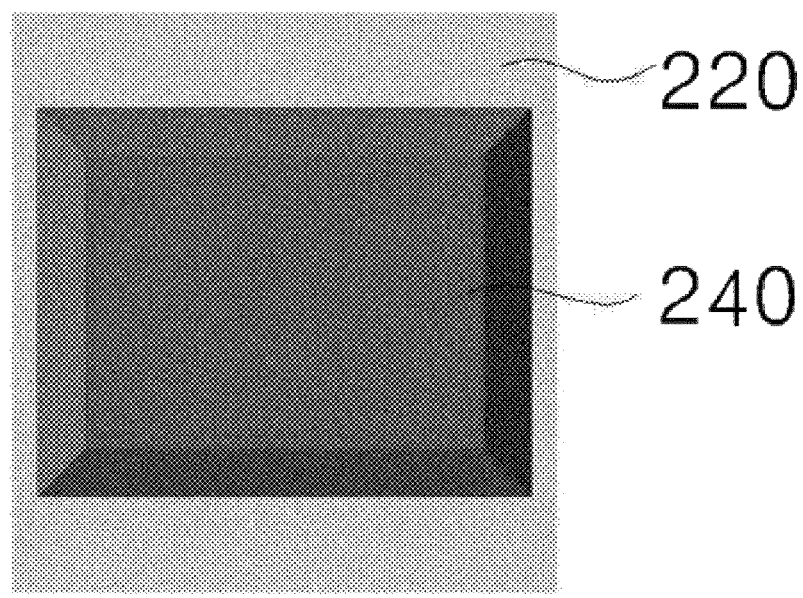

Patterns of light emitted from the second emission layer 230 after this interaction are seen as optical patterns having a predetermined depth effect and a predetermined volumic type (hereinafter referred to as 'stereoscopic light')(FIG. 3C).

The first emission layer and the second emission layer used in the above-described present invention have transparent or semitransparent characteristics in which light transmissivity is 10 to 99% and are preferably applied to a lamp for a vehicle. In this case, a lamp of a vehicle for overseas export can implement stereoscopic light patterns with a volumic type while satisfying the Automotive Manufacturers Equipment Compliance Agency, Inc. (AMECA) standard that stipulates the inside of the lamp should be transparent.

A cut filter 300 may be disposed at an outermost portion of the case 400. The cut filter 300 may be disposed at a front end of the second light source module 200 based on an emission direction of light. The cut filter 300 may transmit visible lights Y2 and X4 that pass through the first emission layer 130 and/or the second emission layer 230 and may reflect the lights X3 and Y3 emitted from the first light guide member 120 and the second light guide member 220. Thus, an observer's eyes can be protected.

An example of a configuration of the invention for implementing stereoscopic light, which is a feature in an embodiment of the present invention, will now be described with reference to FIGS. 1 and 2.

Firstly, in an embodiment of the present invention, a light guide member maximizes light scattering efficiency, without need for an additional reflection plate or reflection patterns, using a member having birefringence characteristics so that characteristics of surface light emission can be improved.

In addition, an emission layer may be an ink layer or a resin layer in which the emission layer responds to a wavelength band of a particular light and excites the light. When it is assumed that a plurality of light source modules are disposed, the emission layer and the light guide member may be formed of a semitransparent or transparent material having 10 to 99% light transmissivity so that adjacent emission layers may interact.

In particular, specifically, referring to FIG. 2, the first emission layer 130 and the second emission layer 230 are disposed adjacent to each other so as to share a portion or all of an optical path that passes through an emission surface 122 of the first light guide member. Excited light generated by passing through the adjacent emission layer can interfere with another emission layer so that implementation of a stereoscopic effect can be attained. To this end, when the first emission layer 130 and the second emission layer 230 are formed on top surfaces of the first light guide member 120 and the second light guide member 220, at least some portions of the first emission layer 130 and the second emission layer 230 overlap each other. That is, even when two light guide members are spaced a predetermined distance apart from each other and a predetermined separation region (air gap) is formed, if the light guide members are viewed in a direction of a final emission surface of lights mutually emitted, emission layers are formed on respective light guide members so that predetermined portions of the emission layers may overlap each other. In this case, the emission layers may have a structure in which they are patterned in various shapes such as circles, rectangles, polygons, and characters and in various images. When an image to be emitted or an image for implementing a stereoscopic effect has a single color, predetermined portions of surfaces of the adjacent light guide members may be in close contact with each other and stacked, and when images to be emitted through the emission layers are different from each other or have different colors, the light guide members may be spaced a predetermined distance apart from each other so as to implement a stereoscopic effect.

That is, in order to implement optical patterns for forming a stereoscopic effect using a predetermined image as an emission layer, as illustrated in FIG. 2, sizes A and B and areas or shapes of the emission layers 120 and 230 may be adjusted, and a distance C between light source modules may be formed or the light source modules may be disposed close together.

Referring to FIG. 3A, in the lighting apparatus according to an embodiment of the present invention, four light source modules are disposed, and a planar shape of each emission layer is implemented as a rectangle. Furthermore, areas of the emission layers 130, 230, 330, and 430 increase going toward a final light emission direction D, and in a mutual planar arrangement structure, portions of the emission layers overlap each other so that excited light in the first light source module 100 affects the adjacent second light source module 200. Furthermore, a fourth light source module 400 has a structure in which interference lights are provided, as emitted light, to first through third emission layers or a fourth emission layer. This is because the excited light from each emission layer or light emitted from one light guide member is easily transmitted to an adjacent light guide member and emission layer since the light guide members and the emission layers are formed of transparent materials. Furthermore, light source modules are spaced a predetermined distance apart from each other.

A stereoscopic light, observed in an emission surface D of the fourth light source module 400 and having this structure, is implemented with stereoscopic light patterns having protruding centers, as illustrated in FIGS. 3B and 3C. Of course, an image implemented to have a depth effect and a volumic type may be implemented through not only an overlapping structure of identical emission layer patterns, but also through an overlapping structure of different images or characters.

The lighting apparatus according to an embodiment of the present invention may be applied to lighting for a vehicle, such as a taillight & stop lamp and a turn signal lamp. That is, the lighting apparatus according to an embodiment of the present invention may be applied to various lamp devices that require lighting, for example lamps for a vehicle, home lighting apparatuses, and industrial lighting apparatuses. For example, when the lighting apparatus is applied to the lamps for a vehicle, it may be also applied to headlights, vehicle indoor lighting, door scuffs, and backlights. Additionally, the lighting apparatus according to the present invention may be applied to backlight units used in liquid crystal display (LCD) devices and may be applied to all lighting fields that have been currently developed and commercially used or can be implemented through future technical development.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:
1. A lighting apparatus comprising a first light source module and a second light source module, which are spaced a predetermined distance apart from each other, wherein the first light source module comprises:
  a first light guide member configured to guide a first light emitted from a first light source; and
  a first emission layer, which is formed on the first light guide member and in which the first light from the first light source is used as excited light, and the first emission layer to provide a third light having a different wavelength than the first light, and wherein the second light source module comprises:

a second light guide member configured to guide a portion of the third light from the first emission layer and a second light emitted from a second light source; and a second emission layer, which is formed on the second light guide member and in which the third light that is provided from the first emission layer and the second light from the second light source are used as excited light, and the second emission layer to provide a fourth light having a different wavelength than the third light from the first emission layer and the second light from the second light source, wherein the fourth light from the second emission layer is to have a stereoscopic effect.

2. The lighting apparatus of claim 1, wherein the first light guide member and the second light guide member are formed of synthetic resin materials for implementing birefringence.

3. The lighting apparatus of claim 2, wherein light transmissivity of the first light guide member and the second light guide member is 10 to 99%.

4. The lighting apparatus of claim 1, wherein light transmissivity of the first emission layer and the second emission layer is 10 to 99%.

5. The lighting apparatus of claim 1, wherein ultraviolet (UV) wavelength light is used as part of the excited light for the first and second emission layers.

6. The lighting apparatus of claim 1, wherein the first emission layer and the second emission layer are disposed adjacent to each other so as to share a portion or all of an optical path that passes through an emission surface of the first light guide member.

7. The lighting apparatus of claim 6, wherein the second light guide member is spaced a predetermined distance apart from the first light guide member.

8. The lighting apparatus of claim 6, wherein the first emission layer is on a top surface of the first light guide member, the second emission layer is on a top surface of the second light guide member, and at least one portion of the first emission layer overlaps the second emission layer.

9. The lighting apparatus of claim 6, wherein the first emission layer includes a first pattern layer, the second emission layer includes a second pattern layer, and area of the first pattern layer is different than area of the second pattern layer.

10. The lighting apparatus of claim 6, wherein light of different wavelength bands is used as part of the excited light for the first and second emission layers.

11. The lighting apparatus of claim 1, further comprising a cut filter that blocks light emitted from the first light source and the second light source, and transmits light converted by the first emission layer and the second emission layer.

12. A lamp for a vehicle, comprising the lighting apparatus of claim 1.

13. The lighting apparatus of claim 1, wherein the first emission layer has a first shape, and the second emission layer has a second shape different from the first shape.

14. The lighting apparatus of claim 1, wherein the first emission layer includes transparent ink, and the second emission layer includes transparent ink.

* * * * *